Figure 1:
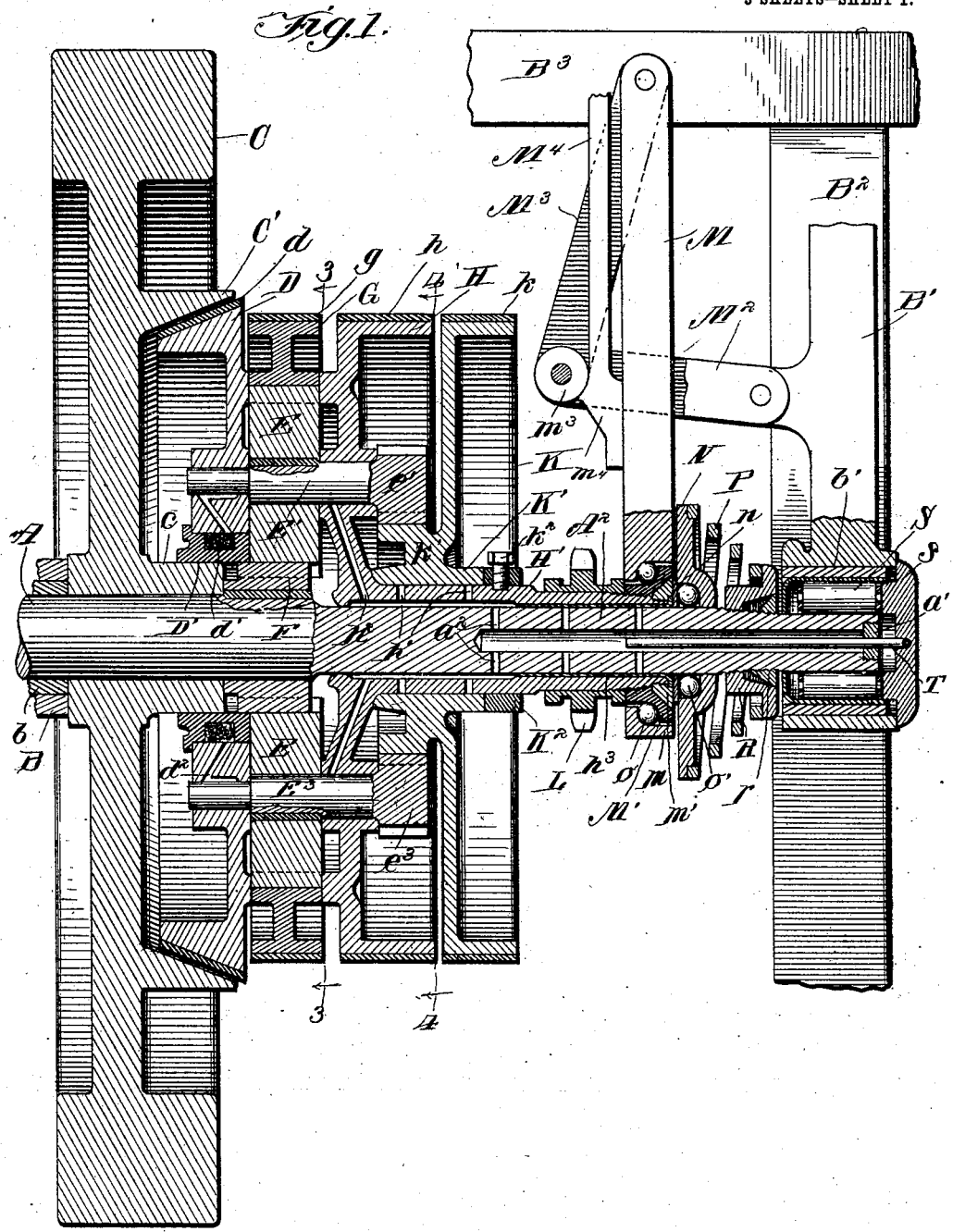

No. 844,760. PATENTED FEB. 19, 1907.
R. SYMMONDS.
TRANSMISSION GEARING.
APPLICATION FILED MAY 11, 1903.

3 SHEETS—SHEET 1.

Witnesses:
H. S. Gaither
D. J. Cunningham

Inventor:
Robert Symmonds,
by Chamberlin & Wilkinson
Attorneys.

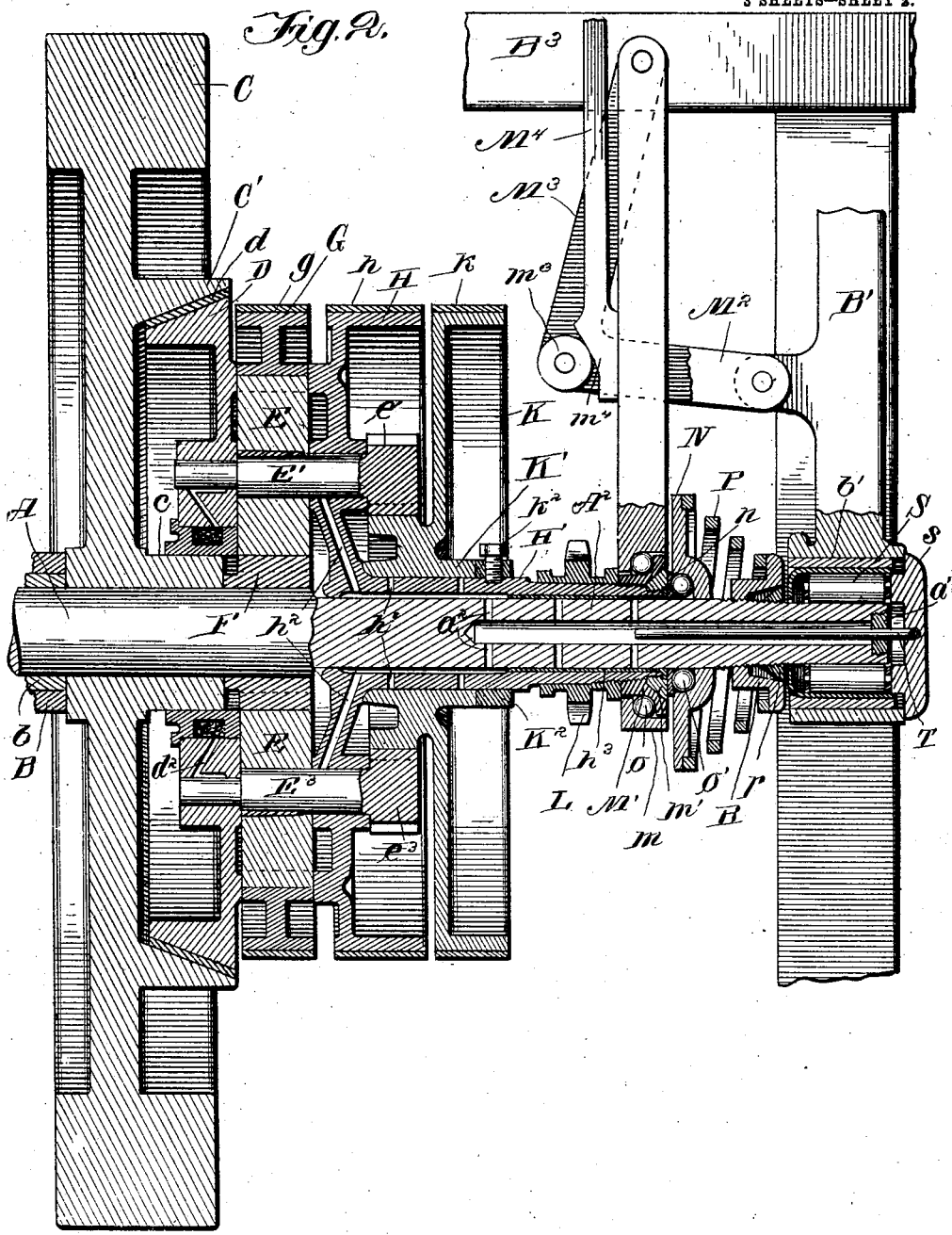

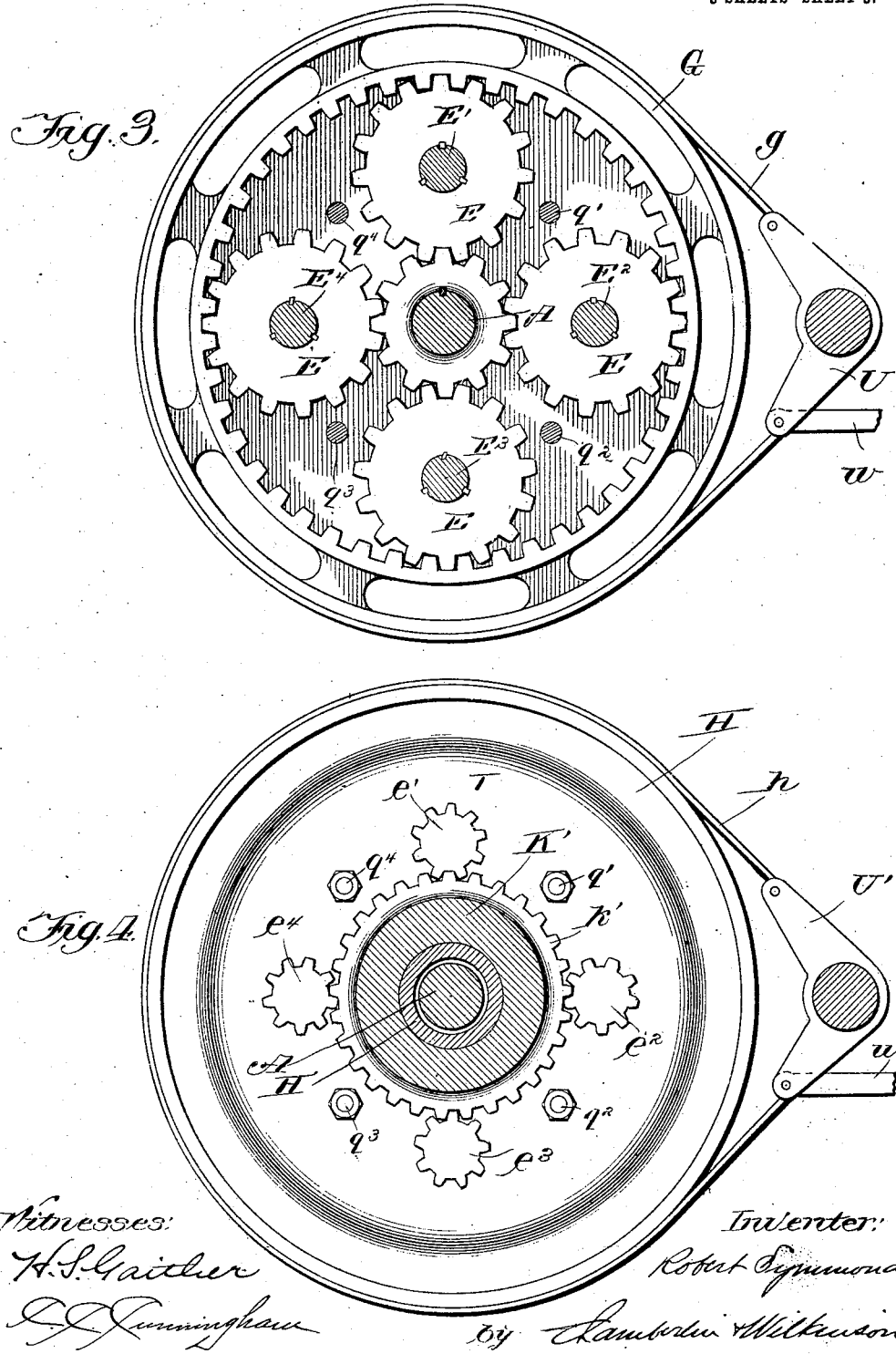

UNITED STATES PATENT OFFICE.

ROBERT SYMMONDS, OF KENOSHA, WISCONSIN, ASSIGNOR TO THOMAS B. JEFFERY, OF KENOSHA, WISCONSIN.

TRANSMISSION-GEARING.

No. 844,760.  Specification of Letters Patent.  Patented Feb. 19, 1907.

Application filed May 11, 1903. Serial No. 156,685.

*To all whom it may concern:*

Be it known that I, ROBERT SYMMONDS, a citizen of the United States, residing at Kenosha, county of Kenosha, State of Wisconsin, have invented a certain new and useful Improvement in Transmission-Gearing, and declare the following to be a full, clear, and exact description of the same, such as will enable others skilled in the art to which it pertains to make and use the same, reference being had to the accompanying drawings, which form a part of this specification.

My invention relates in general to power-transmission mechanism, and more particularly to differential gearing interposed between a motor and a driven element whereby the latter may be rotated at various speeds in one direction or in a reverse direction.

It is desirable, especially in automobiles, to so connect the motor with a driven element, which in turn is operatively connected to the rear axle of the automobile, that the speed and power transmitted from the motor may be varied at the will of the operator and that the direction of rotation of the driven element may be reversed while the motor continues to run in the same direction.

The primary object of my invention is to provide transmission mechanism for connecting a motor to a driven element which may be readily adjusted to inversely vary the speed and power of rotation of the element or to reverse the direction of rotation thereof.

A further object of my invention is to provide a differential transmission mechanism which will be simple in construction, inexpensive in manufacture, and efficient in operation.

My invention, generally described, consists in a shaft rotatively connected to a motor, a clutch member fixed upon the shaft, a second coöperating clutch member loosely surrounding the shaft, a driven element loosely supported upon the shaft and rigidly connected to the second clutch member, a plurality of gear-wheels interposed between the second clutch member and the driven shaft, a plurality of stub-shafts journaled at their opposite ends in the second clutch member and the driven element upon which the plurality of gear-wheels are fixed, a gear-wheel fixed upon the shaft and surrounded by and in mesh with said plurality of gear-wheels, a ring having internal teeth surrounding and meshing with said plurality of gear-wheels, means for locking said ring against rotation, a plurality of pinions fixed upon corresponding ends of said stub-shafts, a gear-wheel loosely mounted upon said driven element surrounded by and meshing with said plurality of pinions, means for locking said last-mentioned gear-wheel against rotation, and means for moving said driven element axially upon the shaft to engage and disengage said clutch members.

My invention will be more fully described hereinafter with reference to the accompanying drawings, in which the same is illustrated as embodied in a convenient and practical form, and in which—

Figure 1 is a central longitudinal section, the clutch members being shown as disengaged; Fig. 2, a view similar to Fig. 1, showing the clutch members engaged; Fig. 3, a section on line 3 3, Fig. 1, looking in the direction of the arrows; and Fig. 4, a section on line 4 4, Fig. 1, looking in the same direction as in Fig. 3.

The same reference characters are used to designate the same parts in the several figures of the drawings.

Reference-letter A indicates a shaft which is rotated by any suitable power connections and may be directly connected to the engine of an automobile.

B indicates a support surrounding the shaft A, while B' indicates a support for the opposite end of the shaft. A bushing *b* is preferably interposed between the bearing B and shaft, while a bushing *b'* is interposed between the opposite end of the shaft and the support B'. Roller-bearings S preferably surround the reduced end of the shaft A and are interposed between the same and the bushing *b'*.

Fixed upon the shaft A adjacent to the bearing *b* is a fly-wheel C, which is provided with a flaring concentric rib C', and thereby constitutes a clutch member fixed upon the shaft.

D indicates a coöperating clutch member provided with a correspondingly-inclined periphery upon which is preferably a frictional wearing-surface *d*. The clutch member D loosely surrounds the shaft A and is preferably mounted upon the hub *c* of the flywheel C. A ring D', adapted to contain a lubricant, is preferably interposed between the clutch member D and the hub c.

A gear-wheel F is fixed upon the shaft A at a point adjacent to the hub c of the flywheel. A plurality of gear-wheels E are located around and mesh with the gear-wheel F. The gear-wheels E are fixed upon stub-shafts $E'$, $E^2$, $E^3$, and $E^4$, which are journaled at their opposite ends in the clutch member D and in the member H. The member H is in the form of a disk provided with a circular flange at its periphery and with an extended hub H', loosely surrounding the reduced portion $A^2$ of the shaft A. A sprocket-wheel L or other power-transmitting device is fixed upon the hub H', so that the member H in effect constitutes a driven element.

A ring G, provided with internal teeth, surrounds the series of gear-wheels E and is in mesh therewith, as clearly shown in Fig. 3. A frictional band g surrounds the ring G and is united at its opposite ends to a bell-crank lever U, supported adjacent to the ring by any suitable means. A rod w or other suitable connection is secured to the bell-crank lever for oscillating the same, and thereby create sufficient frictional resistance between the band g and the ring G to lock the latter against rotation.

The ends of the stub-shafts $E'$, $E^2$, $E^3$, and $E^4$, which are journaled in the member H, are provided with pinions $e'$, $e^2$, $e^3$, and $e^4$, respectively rigidly fixed thereto and preferably integrally formed therewith. A brake-band h surrounds the flange on the periphery of the member H and is caused to frictionally engage the same by any suitable means—such, for instance, as a bell-crank-lever U', actuated by a rod w' and pivotally mounted adjacent to the member H.

Loosely mounted upon the hub H' of the member H is a member K, comprising a disk with a flange located at its periphery and a hub K', provided with an integral gear-wheel k', which is surrounded by and meshes with the pinions $e'$, $e^2$, $e^3$, and $e^4$, as clearly shown in Fig. 4. The member K is prevented from moving axially upon the hub H' by means of a ring $K^2$, fixed upon the hub H' by any suitable means—such, for instance, as a set-screw $k^2$. The hub K' is retained between the ring $K^2$ and a shoulder at the inner end of the hub H'. A brake-band k surrounds the peripheral flange on the member K and is provided with any suitable means for frictionally engaging the same to lock the member K against rotation.

Fixed upon the end of the hub H' is a collar M', upon which is formed a raceway for ball-bearings o. A lock-ring m' engages the end of the hub H' to securely retain the collar M' thereon. A lever M is provided with a ring at one end, which surrounds the collar M' and is in engagement therewith through the medium of the ball-bearing o. The opposite end of the lever M is pivotally secured to a fixed support $B^3$. A link $M^3$ is also secured to the support $B^3$, preferably at the same point at which the end of the lever M is secured. The opposite end of the link $M^3$ is united to a pair of links $M^2$, which are connected at their other ends to the support B'. The two links $M^2$ extend on opposite sides of the lever M and are spaced apart at their ends which are united to the link $M^3$ by means of a roller $m^3$. A rod $M^4$ extends at its lower end between the two links $M^2$ and engages the edge of the lever M. A cam $m^4$ is provided upon the end of the rod $M^4$ which engages the roller $m^3$.

Surrounding the reduced portion $A^2$ of the shaft is a disk N, which engages the end of the hub H' through the medium of the ball-bearing o'. A washer n is preferably provided to receive the wear of the ball-bearing o. A helical spring P bears against the disk N at one end and at its opposite end engages a collar R, surrounding and secured to the shaft. A lock-ring r is preferably provided for retaining the collar R upon the shaft.

T indicates a lubricating feed-tube which is supported in the cap s, which closes the chamber in which the roller-bearings S are located. The tube T extends through the cap a', which closes the opening at the end of the reduced portion $A^2$ of the shaft. The tube T delivers a lubricant to the interior of the hollow portion $A^2$ of the shaft, from which it flows through radial openings to the bushing $h^3$, interposed between the reduced portion $A^2$ of the shaft and the surrounding portion of the hub H'. The lubricant also flows through the openings $a^2$ around the exterior surface of the adjacent portion of the shaft and through the openings h' in the hub H', thereby lubricating the engaged surfaces of the hubs H' and K'. The lubricant also flows through the passages $h^2$ to the bearings formed in the member H, in which are journaled the stub-shafts $E'$, $E^2$, $E^3$, and $E^4$. The opposite ends of the stub-shafts, which are journaled in bearings formed in the clutch member D, are lubricated by means of the passages $a^3$, leading from the lubricant d' contained in the ring D'.

In order that the clutch member D and driven member H may be securely united, connecting-rods $q'$, $q^2$, $q^3$, and $q^4$ are preferably provided, which unite such parts at points intermediate of the stub-shafts $E'$, $E^2$, $E^3$, and $E^4$.

The operation of my invention is as follows: When it is desired to impart the lowest speed to the driven member, the rod $M^4$ is forced into the position shown in Fig. 1, thereby through the engagement of the cam $m^4$ with the roller $m^3$ swinging the lever M about its point of pivotal connection with the support $B^3$ and moving the member H and clutch member D, rigidly secured thereto, out of contact with the coöperating clutch member. Such movement of the clutch member D is effected through the engagement of the lever M with the end of the hub H' and the consequent compression of the spring P by the movement of the lever M when the latter is oscillated through the wedge-like action of the cam $m^4$ and roller $m^3$. The brake-band $g$ is then caused to tightly grip the ring G and lock the latter against rotation. The rotation of the shaft A is consequently imparted to the several gear-wheels E through their engagement with the gear-wheel F, fixed upon the shaft, and their engagement with the temporarily-immovable ring G. The gear-wheels E are consequently driven in the same direction in which the shaft rotates, and such motion is imparted to the member H through the stub-shafts E', $E^2$, $E^3$, and $E^4$. The sprocket-wheel L is consequently rotated at a low speed in the direction of rotation of the shaft, such motion being communicated by suitable power connections to any desired point—such, for instance, as the rear axle of an automobile. When it is desired to rotate the driven element in a direction the reverse of that in which the shaft A rotates, the rod $M^4$ continues in the position shown in Fig. 1, but the brake-band $k$ is caused to tightly engage the peripheral flange on the member K and lock the same against rotation, the brake-band $g$, of course, having been previously loosened, so as to permit the free movement of the ring G, which it surrounds. The gear-wheel $k'$ is consequently held immovable, and the pinions $e'$, $e^2$, $e^3$, and $e^4$, which engage the same and which are rotated through the engagement between the gear-wheel F and the gear-wheels E, are caused to move in a direction the reverse to that of the shaft. The driven member H is carried by the stub-shafts on which the pinions $e'$, $e^2$, $e^3$, and $e^4$ are fixed in a reverse direction to that of the shaft, and such reverse movement is communicated to the sprocket-wheel L. When it is desired to communicate to the driven element the highest speed in the direction of rotation of the shaft, the rod $M^4$ is moved to the position shown in Fig. 2, which permits the spring P to expand and force the clutch member D into frictional engagement with the clutch member fixed upon the shaft. The member H is consequently driven through the direct engagement between the members of the clutch in the direction of rotation of the shaft, and such movement is directly communicated to the sprocket-wheel L. When it is desired to retard or stop the rotation of the driven element, the brake-band $h$ is caused to tightly grip the peripheral flange of the member H, which is at all times directly connected with the sprocket-wheel L, and consequently with the rear axle of the automobile.

From the foregoing description it will be observed that I have invented an improved transmission-gearing in which the driven element may be directly connected to the rotating power-shaft, in which the driven element may also be connected to the power-shaft through interposed speed-reducing gearing, and in which the driven element may be driven in a reverse direction to that of the rotating shaft, such different movements of the driven element being easily effected by the means of a comparatively simple mechanical structure.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having fully described my invention, what I claim as new, and desire to secure by Letters Patent, is—

1. In a transmission-gearing, the combination with a power-shaft, of a clutch member fixed thereon, a second clutch member loosely surrounding said shaft, a driven element rigidly secured to said second clutch member, means for moving said second clutch member axially upon the shaft into and out of engagement with the first clutch member, a gear-wheel fixed upon said shaft, a gear-wheel meshing with said fixed gear-wheel and carried by said second clutch member, an internal gear-wheel concentrically surrounding said shaft and meshing with the gear-wheel carried by the second clutch member, and means for locking said internal gear-wheel against rotation.

2. In a transmission-gearing, the combination with a power-shaft, of a clutch member fixed thereon, a second clutch member loosely surrounding said shaft, a driven element rigidly secured to said second clutch member, means for moving said second clutch member into and out of engagement with the first clutch member, a plurality of gear-wheels located eccentrically with respect to the power-shaft and carried by said second clutch member, a gear-wheel fixed upon the shaft and meshing with each of said plurality of gear-wheels, and an internal gear-wheel surrounding and meshing with said plurality of gear-wheels, and means for locking said internal gear-wheel against rotation.

3. In a transmission-gearing, the combination with a power-shaft, of a fly-wheel mounted upon said shaft, a concentric clutch member carried by said fly-wheel, a second clutch member loosely surrounding said shaft, a driven element rigidly secured to said second clutch member, means for moving said second clutch member axially upon the shaft into and out of engagement with the first clutch member, a gear-wheel fixed upon said shaft, a gear-wheel meshing with said fixed gear-wheel and carried by said second clutch member, an internal gear-wheel concentrically surrounding said shaft and meshing with the gear-wheel carried by the second clutch member, and means for locking said internal gear-wheel against rotation.

4. In a transmission-gearing, the combination with a power-shaft, of a clutch member fixed thereon, a second clutch member loosely surrounding said shaft, a driven element rigidly secured to said second clutch member, means for moving said second clutch member into and out of engagement with the first clutch member, a plurality of stub-shafts journaled at their ends in said second clutch member and said driven element, a gear-wheel fixed upon the power-shaft and meshing with the gear-wheels on the stub-shafts, a gear-wheel upon each of said stub-shafts, an internal gear-wheel surrounding and meshing with said plurality of gear-wheels, and means for locking said internal gear-wheel against rotation.

5. In a transmission-gearing, the combination with a power-shaft, of a clutch member fixed thereon, a second clutch member loosely surrounding said shaft, a driven element rigidly secured to said second clutch member, means for moving said second clutch member axially upon the shaft into and out of engagement with the first clutch member, a gear-wheel fixed upon said shaft, a stub-shaft journaled at its ends in said second clutch member and said driven element having an end projecting through the engaged portion of said driven element, a gear-wheel fixed upon said stub-shaft meshing with said fixed gear-wheel, a pinion fixed upon the projecting end of said stub-shaft, a gear-wheel loosely surrounding said power-shaft and meshing with said pinion, means for locking said last-mentioned gear-wheel against rotation, an internal gear-wheel concentrically surrounding said shaft and meshing with the gear-wheel fixed upon the stub-shaft, and means for locking said internal gear-wheel against rotation.

6. In a transmission-gearing, the combination with a power-shaft, of a clutch member fixed thereon, a second clutch member loosely surrounding said shaft, a driven element rigidly secured to said second clutch member, means for moving said second clutch member axially upon the shaft into and out of engagement with the first clutch member, a gear-wheel fixed upon said shaft, a plurality of stub-shafts journaled at their opposite ends in said second clutch member and said driven element each having one end projecting through the engaged portion of the driven element, a gear-wheel fixed upon each of said stub-shafts meshing with the gear-wheel fixed upon the power-shaft, a pinion fixed upon the projecting end of each of said stub-shafts, a gear-wheel loosely surrounding said power-shaft and meshing with said pinions, means for locking said last-mentioned gear-wheel against rotation, an internal gear-wheel concentrically surrounding said power-shaft and meshing with the gear-wheels fixed upon the stub-shafts, and means for locking said internal gear-wheel against rotation.

7. In a transmission-gearing, the combination with a power-shaft, of a clutch member fixed thereon, a second clutch member loosely surrounding said shaft, a driven element rigidly secured to said second clutch member and comprising an extended hub loosely surrounding and movable axially upon said power-shaft, means engaging said hub for moving said driven element axially upon said power-shaft to engage and disengage said clutch members, a gear-wheel fixed upon said power-shaft, a gear-wheel meshing with said fixed gear-wheel and carried between said second clutch member and said driven element, an internal gear-wheel concentrically surrounding said power-shaft and meshing with the gear-wheel carried by the second clutch member and driven element, and means for locking said internal gear-wheel against rotation.

8. In a transmission-gearing, the combination with a power-shaft, of a clutch member fixed thereon, a second clutch member loosely surrounding said shaft, a driven element rigidly secured to said second clutch member and comprising an extended hub loosely surrounding and movable axially upon said power-shaft, means engaging said hub for moving said driven element axially upon said power-shaft to engage and disengage said clutch members, a gear-wheel fixed upon said power-shaft, a gear-wheel meshing with said fixed gear-wheel and carried between said second clutch member and said driven element, an internal gear-wheel concentrically surrounding said power-shaft and meshing with the gear-wheel carried by the second clutch member and driven element, means for locking said internal gear-wheel against rotation, a concentric frictional member carried by said hub, and a movable frictional member adapted to engage said concentric frictional member to retard the rotation of said driven element.

9. In a transmission-gearing, the combination with a power-shaft, of a clutch member fixed thereon, a second clutch member loosely surrounding said shaft, a driven element comprising an extended hub loosely surrounding and movable axially upon said shaft, means for securing said driven element rigidly to said second clutch member, means engaging said hub for moving said driven element axially upon the power-shaft to engage and disengage said clutch members, a plurality of stub-shafts journaled at their ends in said second clutch member and said driven element, each having one end projecting through the engaged portion of the driven element, a gear-wheel fixed upon each of said stub-shafts, a gear-wheel fixed upon said power-shaft and meshing with the gear-wheels upon the stub-shafts, a pinion fixed upon the projecting ends of each of said stub-shafts, a gear-wheel loosely mounted upon the hub of said driven element and meshing with said pinions, a concentric frictional member carried by said last-mentioned gear-wheel, and a brake-band surrounding and adapted to tightly engage said concentric frictional member.

10. In a transmission-gearing, the combination with a power-shaft, of a clutch member fixed thereon, a second clutch member loosely surrounding said shaft, a driven element rigidly secured to said second clutch member and having an extended hub loosely surrounding and movable axially upon said shaft, a collar fixed to and projecting radially around said hub, a lever engaging said collar, and a cam adapted to reciprocate between said lever and a fixed point and thereby move said hub axially upon said shaft through the medium of said lever.

11. The combination with a driving element, of a driven element, coöperating clutch members interposed between said elements, a gear-wheel rigidly connected to said driving element, a gear-wheel meshing with said first gear-wheel and journaled upon the driven element, an internal gear-wheel surrounding and meshing with said second gear-wheel and located concentrically around the shaft, a pinion journaled upon said driven element, a gear-wheel loosely mounted upon said driven element meshing with said pinion, and means for locking said last-mentioned gear-wheel against rotation.

12. The combination with a driving element, of a driven element, a clutch member fixed to the driving element, a second clutch member secured to the driven element and movably supported with respect to the driving element, means for axially moving said second clutch member into and out of engagement with the first clutch member, and differential speed-varying mechanism interposed between the driving and driven elements.

13. In a transmission-gearing, the combination with a power-shaft, of a clutch member fixed thereon, a second clutch member loosely surrounding said shaft, a driven element rigidly secured to said second clutch member, means for moving said second clutch member axially upon the shaft into and out of engagement with the first clutch member, and differential speed-varying mechanism interposed between the shaft and the driven elements.

14. In a transmission-gearing, the combination with a power-shaft, of a clutch member fixed thereon, a second clutch member loosely surrounding said shaft, a driven element rigidly secured to said second clutch member, means for moving said second clutch member axially upon the shaft into and out of engagement with the first clutch member, a gear-wheel fixed upon said shaft, and differential speed-varying mechanism interposed between said gear-wheel and the driven element.

In testimony whereof I sign this specification in the presence of two witnesses.

ROBERT SYMMONDS.

Witnesses:
T. W. JOHNSTON,
GEO. H. EDDY.